United States Patent
Zheng et al.

(10) Patent No.: US 9,215,658 B2
(45) Date of Patent: Dec. 15, 2015

(54) METHOD AND DEVICE FOR ADJUSTING SLEEP MODE OF MOBILE STATION

(75) Inventors: Wu Zheng, Shanghai (CN); Jimin Liu, Shanghai (CN); Gang Shen, Shanghai (CN); Zhaojun Xu, Shanghai (CN); Xiaobing Leng, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 203 days.

(21) Appl. No.: 13/201,251

(22) PCT Filed: Jan. 6, 2010

(86) PCT No.: PCT/CN2010/070032
§ 371 (c)(1),
(2), (4) Date: Aug. 12, 2011

(87) PCT Pub. No.: WO2010/091602
PCT Pub. Date: Aug. 19, 2010

(65) Prior Publication Data
US 2011/0292866 A1 Dec. 1, 2011

(30) Foreign Application Priority Data

Feb. 13, 2009 (CN) .......................... 2009 1 0046198

(51) Int. Cl.
*H04W 52/02* (2009.01)
*H04B 7/26* (2006.01)
*H04W 84/04* (2009.01)

(52) U.S. Cl.
CPC ......... *H04W 52/0225* (2013.01); *H04B 7/2606* (2013.01); *H04W 84/047* (2013.01)

(58) Field of Classification Search
CPC ............. G06Q 30/02; H04L 29/08936; H04L 12/1859; H04L 12/5895; H04L 12/189
See application file for complete search history.

(56) References Cited

U.S. PATENT DOCUMENTS

| 7,430,421 B2 | 9/2008 | Park |
| 2007/0086417 A1 | 4/2007 | Jang et al. |

(Continued)

FOREIGN PATENT DOCUMENTS

| CN | 1592292 A | 3/2005 |
| CN | 1941734 A | 4/2007 |

(Continued)

OTHER PUBLICATIONS

International Search Report for PCT/CN2010/070032 dated Apr. 8, 2010.

*Primary Examiner* — Jung Park
(74) *Attorney, Agent, or Firm* — Fay Sharpe LLP (57) ABSTRACT

The present invention provides a method and a device for adjusting the sleep mode of a mobile station in order to solve the problem in current multi-hop relay systems of long time delays in data transmission caused when data packets have to wait for the next listening window to reach the mobile station because of packet errors. Wherein, a relay apparatus judges whether the previous hop network apparatus needs to retransmit data packets to the mobile station; when the previous hop network apparatus needs to retransmit data packets to the mobile station, the relay apparatus transmits to the mobile station the adjustment related information for adjusting the sleep mode of the mobile station. The mobile station adjusts the sleep mode according to the adjustment related information. Preferably, the adjustment related information comprises indicating information for indicating that the mobile station is in triggered listening status within predetermined time interval. In addition, the relay apparatus may also report the adjustment related information to the previous hop network apparatus. The technical solution provided by the present invention obtains shorter time delays, utilizes wireless resources efficiently, and decreases demand on relay apparatus.

11 Claims, 4 Drawing Sheets (56) References Cited

U.S. PATENT DOCUMENTS

| | | |
|---|---|---|
| 2007/0275656 A1* | 11/2007 | Chang et al. .................. 455/9 |
| 2007/0275657 A1 | 11/2007 | Chang et al. |
| 2008/0248293 A1 | 10/2008 | Hanson et al. |
| 2009/0313518 A1 | 12/2009 | Shen et al. |
| 2010/0017672 A1 | 1/2010 | Suga |
| 2010/0041445 A1* | 2/2010 | Qi et al. .................... 455/574 |
| 2011/0002253 A1* | 1/2011 | Cha et al. ................... 370/311 |

FOREIGN PATENT DOCUMENTS

| | | |
|---|---|---|
| CN | 101431790 A | 5/2009 |
| KR | 10-2008-0069092 | 7/2008 |
| WO | WO 2007/033613 A1 | 3/2007 |
| WO | WO 2007/046619 A1 | 4/2007 |
| WO | WO 2008/034335 A1 | 3/2008 |
| WO | WO 2008/129677 | 10/2008 |

* cited by examiner

METHOD AND DEVICE FOR ADJUSTING SLEEP MODE OF MOBILE STATION

FIELD OF THE INVENTION

The present invention relates to communication network, especially relates to relay apparatus and mobile station in wireless communication network.

BACKGROUND OF THE INVENTION

Mobile communications have changed people's lives and people have also new higher requirements for mobile communication networks. Mobile networks operator needs to provide better coverage, higher user throughput (especially for cell edge users), lower transmission latencies and longer battery life of mobile station. These are also the target of IMT-Advanced (International Mobile Technology-Advanced), and several standardization organizations have launched new studies for next generation mobile communications, e.g. IEEE (The Institute of Electrical and Electronics Engineers) 802.16m and LTE-Advanced(Long Term Evolution-Advanced), etc.

As a cost-efficient way to extend coverage and enhance user throughput (especially for cell-edge users), multi-hop relay technique has been employed in the WiMAX (Worldwide Interoperability for Microwave Access) system and LTE-Advanced.

As for longer battery life, on the one hand, advanced design methods and new material should be employed to increase battery capacity; on the other hand, with the help of mobile communication network, the negotiation mechanism between mobile station (MS) and network is utilized, for example, the introduction of sleep mode of the mobile station can reduce the awake time of the mobile station, thus saving the power consumption of the mobile station. However, sleep mode has some negative influence on the latency-sensitive service, that is, the real-time service that requires low latency, such as voice communication service, etc. Therefore, how to trade off between power-saving of the battery and real time property with a negligible overhead in multi-hop relay system is a technical problem which will be resolved in present invention.

Sleep mode means the negotiation between the MS and network, the base station only schedules the data transmission at a special interval, named "listening window"; and the MS keeps the sleeping status during the other intervals, named "sleeping interval".

Considering that multi-hop relay system comprises multiple links, if some errors occur at any link on the path between BS to MS, the rescheduling and retransmission will he implemented, and then "listening interval" may be missed by the MS. The current solution is to wait for the next "listening interval" to transmit data to MS; as shown in FIG. 1, the detailed procedures of waiting for the next "listening interval" to retransmit data can be described as follows.

Figure 1:
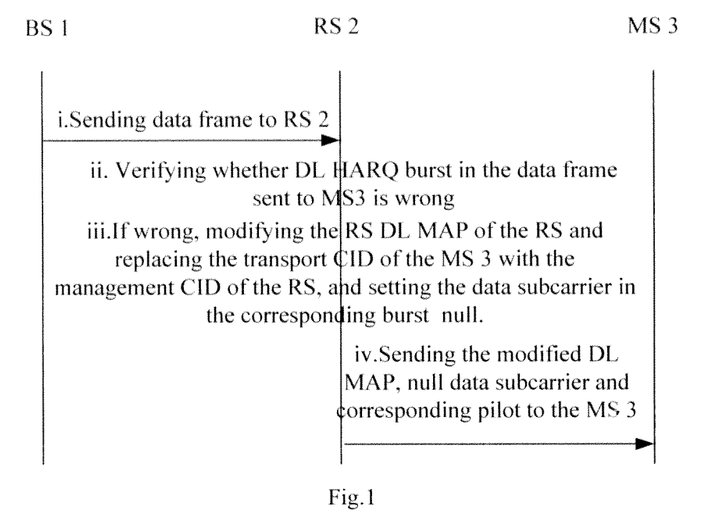
FIG. 1 is an exemplary diagram of the process flow when the RS detects wrong packet in the prior arts.

As shown in FIG. 1, for example, the BS1 in multi-hop relay system adopts centralized scheduling and the data packets use the coding scheme of HARQ (Hybrid Automatic Repeat reQuest), the process flow when the relay station (RS) 2 detects wrong packets is described as follows. The BS 1 shown in FIG. 1 is located in vs ireless multi-hop relay network, the BS 1 can establish communication with the MS 3 via one or more RSs 2, and can also establish communication with the MS 3 directly.

At Frame N, as shown in step i of FIG. 1, the BS 1 schedules an initial transmission of HARQ packet on all the links between the BS 1 and MS which comprise not only relay link between the BS 1 and the RS 2 or between the RS 2 and the RS 2 but also access link between the BS 1 and MS 3 or between the RS 2 and the MS 3, that is, allocates communication resources such as time and frequency resources for all of network apparatuses on the relay link and access link, and sends the DL HARQ burst to the next hop RS 2; moreover, at the same frame BS 1 sends DL MAP comprising RS relay MAP message to the RS 2, and sends RS access MAP message to the RS 2, as shown in step i of FIG. 1.

Then, as shown in step ii of FIG. 1, the RS 2 verities whether the DL HARQ burst in the data frames sent to the MS 3 is wrong. Specifically, the RS 2 can check through CRC (Cyclic Redundancy Code).

Then, as shown in step iii of FIG. 1, if wrong, then the RS 2 modifies the RS DL MAP of itself and replaces the transport CID of the MS 3 with the management CID (connection ID) such as basic CID of itself, and sets the data subcarrier of the wrong data burst to be sent to the MS 3 null.

Then, in step iv, the RS 2 sends the modified DL MAP, null data subcarrier and corresponding pilot to the MS 3. Since the transport CID of the MS 3 is replaced by the management CID of RS, actually, the MS 3 does not know there is data sent to it.

Furthermore, the RS 2 sends NACK (Not Acknowledge) message to notify the transmission failure according to the retransmission mechanism configured by network. Then, the BS 1 will schedule retransmission.

The aforesaid description of the prior arts is explained with the example that the nearest RS 2 to the BS 1 detects transmission error. Certainly, the position of the RS 2 which detects error is not limited by aforesaid example, the RS 2 which detects error can be in the second hop, the third hop, etc. The RS in different positions processes the wrong packet in similar steps to aforesaid steps; therefore, it is no necessary to repeat again.

The scheduling of the BS 1 must guarantee that the retransmission of data packets reaches the MS 3 within the listening window of the MS 3, so the MS 3 will not lose data packets. In case that wrong packet does not occur, the scheduling of the BS 1 can guarantee that data packets reach the MS 3 within predetermined listening window; however, in case that wrong packet occurs, the BS 1 will reschedule data packets to make the retransmitted data packets reach the MS 3 within the next listening window of the predetermined listening window. Therefore, the current solutions will bring following disadvantages:

1. the MS 3 may receive data packets within the next listening window of the predetermined listening window according to the retransmission mechanism of the BS 1, therefore, this will cause longer latency and decrease the QoS (Quality of Service) of the real time service such as voice etc, and decrease the user experience;
2. since the null data subcarrier does not carry any useful information, so this wastes valuable wireless resource;
3. the intermediate RS 2 will store a plurality of unsuccessful transport packets because of relative long scheduling delay, thereby a plenty of storage is required and thus device cost of the RS 2 is increased.

SUMMARY OF THE INVENTION

In view of the existing aforesaid problem of the prior arts, the present invention proposes a method and device for controlling a mobile station to adjust sleep mode when retransmission is needed.

According to the first aspect of the present invention, a method, in the wireless relay apparatus, for controlling a mobile station dominated by a relay apparatus to adjust sleep mode is provided, wherein the method comprises following steps: a. judging whether previous hop network equipment of the relay apparatus needs to resend data packets and/or scheduling information to the mobile station; b. sending adjustment related information for adjusting sleep mode of the mobile station to the mobile station when the previous hop network equipment needs to resend data packets and/or scheduling information to the mobile station.

According to the second aspect of the present invention, a method, in wireless mobile station, for adjusting sleep mode is provided, wherein the method comprises following steps: A. receiving adjustment related information for adjusting sleep mode of the mobile station from relay apparatus; B. adjusting sleep mode according to the adjustment related information.

According to the third aspect of the present invention, a first control device, in wireless relay apparatus, for controlling a mobile station dominated by a relay apparatus to adjust sleep mode is provided, wherein the first control device comprises: a judging means, for judging whether previous hop network equipment of the relay apparatus needs to resend data packets and/or scheduling information to the mobile station; a sending means, for sending adjustment related information for adjusting sleep mode of the mobile station to the mobile station when the previous hop network equipment needs to resend data packets and/or scheduling information to the mobile station.

According to the fourth aspect of the present invention, a second control device, in wireless mobile station, for adjusting sleep mode is provided, wherein the second control device comprises: a receiving means, for receiving adjustment related information for adjusting sleep mode of the mobile station from relay apparatus; an adjusting means, for adjusting sleep mode according to the adjustment related information.

the advantages of using the technical scheme provided by the present invention is listed as follows:

(1) relative short latency can be achieved, the BS 1 or the RS 2 need not wait till the next listening window to send user data to the MS 3, which increases the level of service, especially suitable for the latency-sensitive service, for example the service having high demand for the real time property, such as voice transmission and video transmission;
(2) utilizing the wireless resource fully and effectively, and preventing the transmission of null data subcarrier in the prior arts;
(3) the modification for current standard is very small, only a management message of MAC (Media Access Control) layer needs to be defined;
(4) decreasing the demand for the apparatus of the RS 2, which need not store a plenty of data for subsequent retransmission.

BRIEF DESCRIPTION OF THE DRAWINGS

By reading the detailed description of the non-limiting embodiments with reference to the following drawings, other features, objects and advantages of the present invention will become more apparent.

In drawings, same or similar reference signs refer to the same or similar step feature or device/module.

DETAILED DESCRIPTION OF EMBODIMENTS

Figure 2:
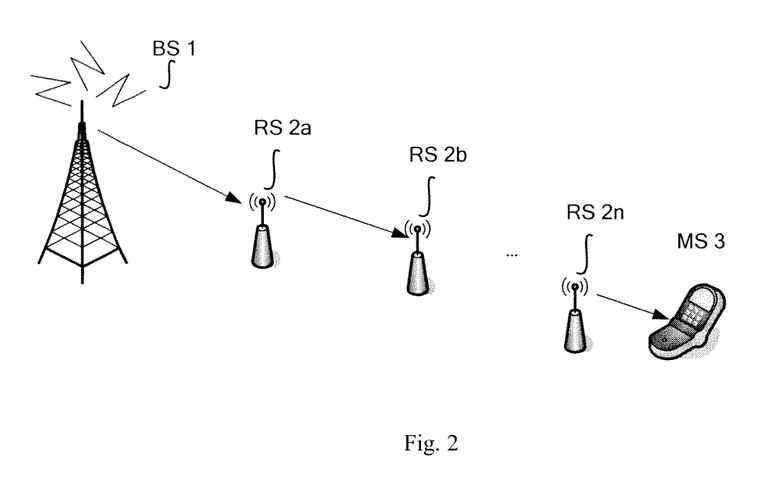
FIG. 2 shows a schematic diagram of a network topology of an embodiment of the present invention.

FIG. 2 shows a schematic diagram of a network topology of an embodiment of the present invention. FIG. 2 shows a multi-hop relay system. Through the initial scheduling and configuration of the BS 1, the BS 1 determines n RSs in its link, which are respectively 2a, 2b . . . 2n, which are used for assisting the BS 1 to process and forward data packets sent to the MS 3.

Figure 3:
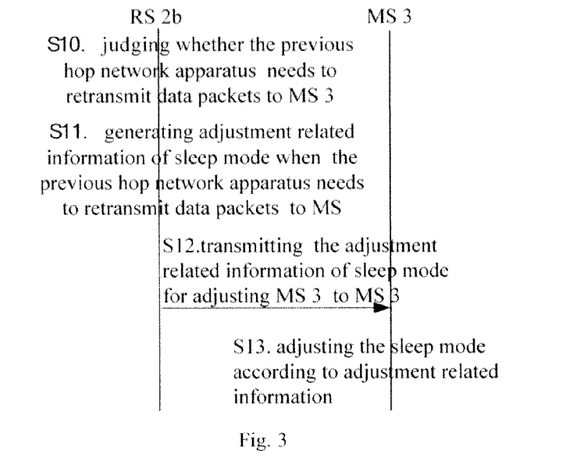
FIG. 3 shows a schematic flow diagram of a method according to a detailed embodiment of the present invention.

FIG. 3 shows a schematic flow diagram of a method according to a detailed embodiment of the present invention. In the embodiment, the RS 2b is taken as an example to describe.

In step S10, the RS 2b firstly judges whether the previous hop network apparatus of the RS 2b needs to retransmit data packets to the MS 3. As shown in FIG. 2, in the embodiment the previous hop network apparatus of the RS 2b is the RS 2a. When any one of the following three cases occurs, the judging result of the RS 2b is that the previous hop network apparatus needs to retransmit data packets and/or scheduling information to the MS 3:

Case 1: the RS 2b receives data packet from the RS 2a and checks that error occurs from this data packet.

For example, the RS 2b uses cyclic redundancy check code to check data packets from the RS 2a, and judges data packet errs, then the RS 2b judges the previous hop network apparatus, that is, the RS 2a needs to retransmit data packets and/or scheduling information to the MS 3. Certainly the transmitter and the receiver can also use other error check codes as long as both sides have agreed in advance, all of which belong to the protection scope of the present invention.

Case 2: the RS 2b receives NACK message from the next hop network apparatus.

In an embodiment, the next hop network apparatus of the RS 2b is the MS 3. After the MS 3 receives data packets from the BS 1, the MS 3 will also use cyclic redundancy check code or other error check codes to check the received data packets. If the check failed, the MS 3 will report negative confirmation message, that is, NACK message to the BS 1 to request the BS 1 to retransmit data packets. The NACK message will reach the BS 1 via each RS in the link, that is, the RSs 2b and 2a. When the RS 2b receives NACK message from the MS 3, the RS 2b judges that the RS 2a needs to transmit scheduling information to the MS 3. For example in the scenario of centralized scheduling, the RS 2b judges that the RS 2a needs to transmit scheduling information to the MS 3, since the retransmission resource is pre-allocated by the BS 1 and processed and forwarded by each RS in the centralized scheduling scenario.

In a varied embodiment, when the next hop network apparatus of the RS 2b is RS, similarly, the RS 2b judges the RS 2a needs to transmit scheduling information to the next hop relay apparatus after the RS 2b receives NACK message from the next hop relay apparatus.

Case 3: the RS 2b does not receive feedback message from the next hop network equipment before a predetermined interval expires.

In an embodiment, the next hop network apparatus of the RS 2b is the MS 3. After the RS 2b transmits data packets to the MS 3, the RS 2b might obtain its position information in advance, which comprises the distance between the RS 2b and the MS 3, such as: hop number information between the RS 2b and the MS 3, then the RS 2b may estimate when the feedback message of the MS 3 can reach the RS 2b. The feedback message comprises positive confirmation message such as ACK and negative confirmation message such as NACK. For example, the RS 2b is 5 hops away from the MS 3, then 5 hops is needed for data packets to reach the MS 3, and the feedback message from the MS 3 to the RS 2b also needs 5 hops to reach the RS 2b, thus the RS 2b can estimate the reaching time of the feedback message. 1) When transmission of data packets in relay link or access link goes wrong so that the MS 3 fails to receive data packets, the MS 3 will not transmit the feedback message to the previous hop network apparatus; thereby the RS 2b is unable to receive the feedback message from the MS 3 within a certain time interval. 2) besides, if the MS 3 receives data packets from the previous hop network apparatus, and transmits feedback message, the feedback message is missed during transmission, the RS 2b is unable to receive the feedback message from the MS 3 within a certain time interval, either. For example, after each data packet reaches the RS 2b, a timer can be set up for the data packet to record the reach time of the feedback message of this data packet. After the timer shows the certain time interval is expired, and the RS 2b does not yet receive the feedback message from the MS 3, the RS 2b judges that the RS 2a needs to retransmit data packets and/or scheduling information to the MS 3.

In a varied embodiment, when the next hop network apparatus of the RS 2b is RS, similarly, if the RS 2b does not receive feedback message from the next hop network equipment yet before a predetermined interval expired, the RS 2b judges that the RS 2a needs to retransmit data packets and/or scheduling information to the next hop relay station.

In step S10, when the RS 2b judges that the RS 2a needs to retransmit data packets and/or scheduling information to the MS 3, the present invention enters step S11, the RS 2b generates adjustment related information of sleep mode.

According to the interaction of network configuration information between the RS 2b and the BS 1, the shared content and frequency, the RS 2b can generate different adjustment information of sleep mode, which is divided into three solutions to describe:

Solution 1:

The RS 2b obtains network configuration related information from the BS 1 by the coordination with the BS 1, which comprises the scheduling strategy of the BS 1, the retransmission mechanism used by the link in which the RS 2 is located, and the topology of the relay network, etc.

Wherein, the scheduling strategy of the BS 1 comprises load parameters of cells dominated by the BS 1, the priority of each mobile station scheduled by the BS 1, the priority of each different services, etc. For example, the BS1 divides its dominated mobile stations into different priority levels, if data retransmission for the mobile station is needed, the BS 1 can determine the waiting time for scheduling retransmission for the MS according to different priority level of each MS, or, the BS1 divides different services into different levels, the BS1 can also determine the waiting time for scheduling retransmission for different services of MS according to the priority of service. For example, when a MS is VIP user and its requested service is voice service, that is, requiring shorter latency, then the BS1 can schedule retransmission for this VIP user preferentially.

Figure 4A:
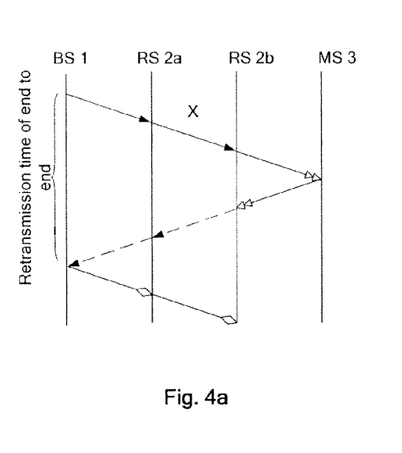
FIGS. 4a and 4b are respective schematic diagrams of retransmission mechanisms of end to end and hop by hop.
Figure 4B:
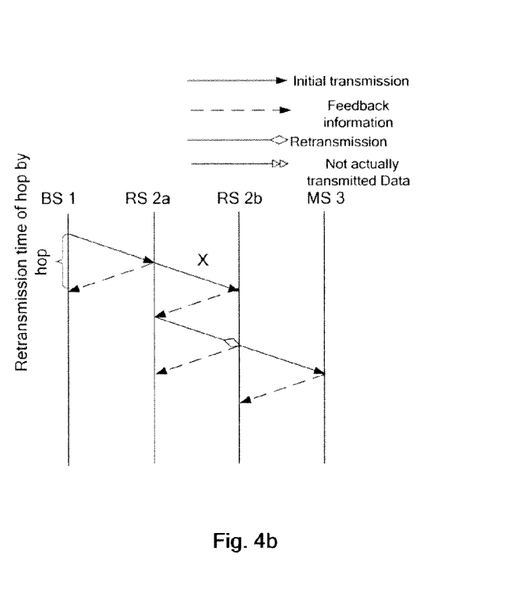

The retransmission mechanism used by the link in which the RS 2 is located comprises retransmission mechanisms of end to end and hop by hop, which are respectively shown in FIGS. 4a and 4b. Wherein, x denotes that data packet transmission fails. The solid line and solid triangle arrow in the figure denote initially transmitted data, the dotted line and a solid triangular arrow denote feedback information, the solid line and diamond arrow denote retransmitted data, the solid line and two hollow triangle arrows denote the data which is not transmitted actually. FIG. 4a shows the retransmission mechanism of end to end, and FIG. 4b shows the retransmission mechanism of hop by hop. As shown in FIG. 4a, in the retransmission mechanism of end to end, each relay apparatus will process data packets, if checking right, forwarding downward; if errors occurs, not forwarding downward, all the positive/negative confirmation information of HARQ will be delivered to the BS 1 together. In FIG. 4a, since no errors occur in the packets transmitted from the BS 1 to the RS 2a, the BS 1 only needs to transmit the RS 2a the scheduling information for indicating the resource for retransmission allocated by the BS 1 and need not retransmit data packets to the RS 2a, the RS 2a retransmits data packets to the RS 2b and forwards the scheduling information. By contrast, as shown in FIG. 4b, in the retransmission mechanism of hop by hop, the RS can react immediately after detecting data packet error. For example, in FIG. 4b, when detecting packet error, the RS 2b can report to the RS 2a immediately, and the retransmission can be established at the nearest RS (for example the RS 2a), thereby the reaction time and transmission delay is shortened, but each RS needs more resource to perform HARQ feedback, at the cost of decreasing certain transmission efficiency.

The topology of the relay network comprises the position information of the RS 2b, etc, for example, comprises the hop number from the RS 2b to the BS 1 and the hop number from the RS 2b to the MS 3.

For example, the RS 2b obtains, from the BS 1, that the retransmission mechanism of the relay network is HARQ retransmission mechanism of hop by hop, therefore, when the RS 2b detects data packets transmission error, the previous hop network apparatus of the RS 2b, namely the RS 2a retransmits data packets. Position information of the RS 2b comprises: the hop number from the RS 2b to the BS 1 is 2 hops, the hop number from the RS 2b to the MS 3 is 5 hops, for example. Furthermore, the MS 3 is VIP user, what the MS 3 requests is voice service, then the RS 2b can estimate the accurate reaching time at which the data packet retransmitted by the RS 2a reaches the MS 3, thus the starting time of the triggered listening status can be determined. Since the starting time of the triggered listening status obtained at this time is an accurate reaching time of data packet, the RS 2b can calculate the transmission time of data packet according to the size of data packet, and then calculate the end time of the triggered listening status according to the starting time and the transmission time of data packet. As shown in solution 1 in FIG. 5, the RS 2b indicates that the MS 3 switches from sleeping status to the triggered listening status at the time T1, that is, enters triggered listening window at the time T1, and then indicates that the MS 3 switches from the triggered listening status to sleeping status at the time T2, that is, the RS 2b indicates that the MS 3 is in the triggered listening status within the predetermined time interval, namely the time interval from T1 to T2. Alternatively, the RS 2*b* can also generate indicating information indicating the starting time T1 of the triggered listening status and predetermined time interval T1-T2.

Solution 2:

The RS 2*b* obtains network configuration related information from the BS 1 by the coordination with the BS 1, which comprises HARQ retransmission mechanism used by the link in which the RS 2*b* is located, the topology of the relay network, and position information of the RS 2*b*, etc.

HARQ retransmission mechanism used by the link in which the RS 2 is located comprises retransmission mechanisms of end to end and hop by hop, which are respectively shown in FIGS. 4*a* and 4*b*. Similar o solution 1 it is not necessary to repeat again.

The topology of the relay network comprises the position information of the RS 2*b*, etc, for example, comprises the hop number from the RS 2*b* to the BS 1 and the hop number from the RS 2*b* to the MS 3.

For example, the RS 2*b* obtains, from the BS 1, that the retransmission mechanism of the relay network is HARQ retransmission mechanism of end to end, therefore, when the RS 2*b* detects data packets transmission error, the BS 1 schedules retransmission of data packets. Position information of the RS 2*b* comprises: the hop number from the RS 2*b* to the BS 1 is 2 hops, the hop number from the RS 2*b* to the MS 3 is 5 hops, for example. Then, the RS 2*b* can estimate, according to aforesaid information, the earliest reaching time of the retransmitted data packets, since this time is the earliest reaching time of the retransmitted data packets, the RS 2*b* is unable to obtain the accurate time at which the retransmitted data packets reaches the MS 3, but the RS 2*b* can judge the earliest time at which the retransmitted data packets reaches the MS 3, Therefore, as shown in solution 2 in FIG. 5, the RS 2*b* generates the indicating information for indicating that the MS 3 switches from sleeping status to the triggered listening status from the time T3, and is constantly in the triggered listening status.

Figure 5:
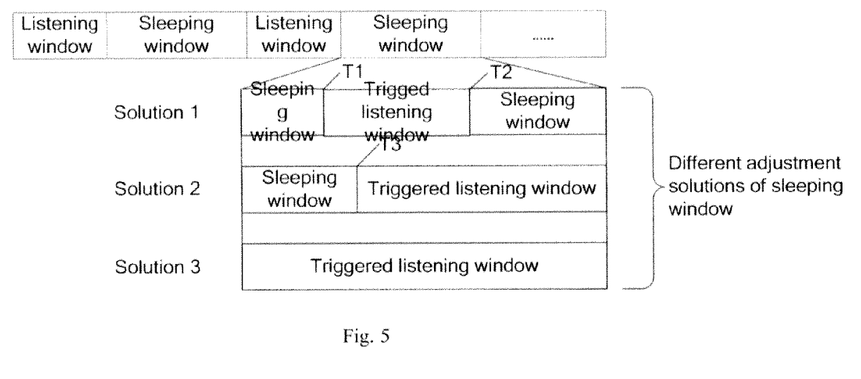
FIG. 5 shows schematic diagrams of three kinds of different sleeping window adjustment schemes according to the present invention.

Solution 3:

If the RS 2*b* can not obtain the network configuration information from the BS 1, the RS 2*b* informs the MS 3 that the MS 3 needs to be in the triggered listening status within the whole sleeping window, as shown in solution 3 in FIG. 5, so the retransmitted data packets will not be missed.

In the solution 1 and 2, the network configuration information obtained by the RS 2*b* can be the network configuration information stored in the RS 2*b* during network configuration initiation after the BS1 and the RS 2*b* interact network configuration information; the network configuration information obtained by the RS 2*b* can also be the network configuration information which the BS 1 transmits to the RS 2*b* after the RS 2*b* queries the BS 1 in real time.

Figure 6:
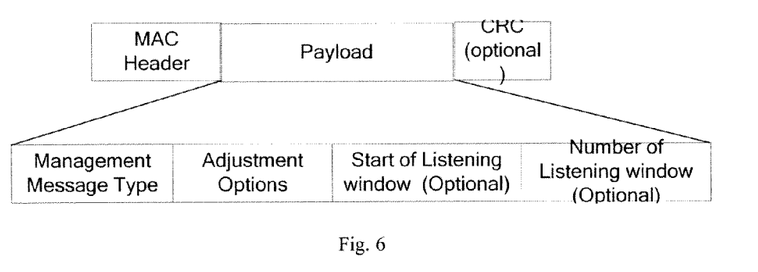
FIG. 6 shows a schematic diagram of frame format according to a detailed embodiment of the present invention.

FIG. 6 shows possible MAC management message format.

The management message is an extension to the payload of MAC message, each field in the MAC management message is respectively described in detail as follows:

Management message type:

Management message type indicates that the message is the message used for adjusting sleep mode, namely for triggering the MS 3 to enter the trigged listening status. The so-called trigged listening status is a temporary listening mode. The MS 3 should have been in sleeping status within this time interval according to initial setting. However, in the present invention, in order to guarantee that the MS 3 can receive the retransmitted data packets from the BS 1, the MS 3 needs to enter temporary listening status within the time interval, thus the listening mode is triggered by the event of retransmitting data packets.

Adjustment options:

Adjustment options, information indicating solution for adjusting temporary triggered window, which can be de denoted by two bits, for example:

00 denotes solution 1;
01 denotes solution 2;
10 denotes solution 3;
11: reserved.

The starting time of listening window (optional)

The starting time of listening window (optional), namely the triggered time of triggering to enter the triggered listening status, the starting time information of the listening window can be denoted by superframe number, frame number and/or subframe number. The starting time can be applied to the solutions 1 and 2 shown in FIG. 5.

The number of listening window (Optional)

The number of listening windows (optional), namely the duration of the triggered listening status, the number information of the listening windows can be denoted by the number of superframes, the number of frames and/or the number of subframes. The number of listening window can be applied in the solution 1 shown in FIG. 5.

Furthermore, the number of listening windows can also be replaced by the end time of listening window.

In step S11, the RS 2*b* generates different sleep mode adjustment information by selecting one from solutions 1 to 3 on the basis of aforesaid message format according to the obtained condition of network configuration information. Certainly, the message format is not limited to this, and the above is only an exemplary message format.

Then, in step S12, the RS 2*b* transmits the generated adjustment related information of sleep mode to the MS 3.

In step S13, the MS 3 adjusts the sleep mode of the MS 3 according to the solution in FIG. 5, according to the adjustment related information of sleep mode received from the RS 2*b*. The MS 3 may also accordingly use three kinds of different adjustment modes, corresponding to the three solutions in FIG. 5, which is described as follows:

Adjustment Manner 1:

If the adjustment related information of sleep mode received by the MS 3 indicates the MS 3 to use solution 1, for example, referring to FIG. 6, if the adjustment option in the payload of MAC management message is 00, the MS 3 adjusts the sleep mode according to solution 1 in FIG. 5, for example, entering the triggered listening status at the time T1, and then finishing the triggered listening status at the time T2, and entering sleeping status again.

Adjustment Manner 2:

If the adjustment related information of sleep mode received by the MS 3 indicates the MS 3 to use solution 2, for example, referring to FIG. 6, if the adjustment option in the payload of MAC management message is 01, the MS 3 adjusts the sleep mode according to solution 2, entering the triggered listening status at the time T3.

Adjustment Manner 3:

If the adjustment related information of sleep mode received by the MS 3 indicates the MS 3 to use solution 3, for example, referring to FIG. 6, if the adjustment option in the payload of MAC management message is 10, the MS 3 adjusts the sleep mode according to solution 3, that is, not entering the sleeping status, but keeping listening status.

Furthermore, when the MS 3 detects that data transmission is finished, it can enter the sleeping status automatically.

Optionally, the MS 3 can also enter the sleeping status according to the indicating of the RS 2b, as shown in solution 1.

In aforesaid embodiment, the step S11 is achieved by the RS 2b, that is, the RS 2b generates the adjustment related information of sleep mode according to network configuration information, which considers that the RS and BS both belong to network apparatus and are managed by operator, and interacting network topology between the RS and BS will not disclose network information to users, which guarantees the network safety.

Without considering the network safety, in a varied embodiment, the step S11 can be omitted, then in the step S12', the adjustment related information transmitted by the RS 2b to the MS 3 comprises network configuration information. For example, network configuration information may comprise the position information of the RS in which error is found. For example, when the RS 2b detects error packet, the RS 2b can add identification information into the packet to identify that data packet error occurs in the second hop. Furthermore, the adjustment related information may also comprise the retransmission mechanism configured by the BS dominating the MS, the scheduling strategy of the BS, etc.

Then, in the step S13, the MS 3 determines mode adjustment information for adjusting sleep mode according to the network configuration information. For example, the MS 3 determines which one of solutions 1 to 3 should he used to adjust the sleep mode of the MS 3, according to the obtained position information of the RS in which error is found and the retransmission mechanism configured by the BS 1. Since the operation is basically similar to the operation in the step S11, it is not necessary to repeat again.

The application scenario of the embodiment is that the BS 1 has already known in advance during the initial period of network configuration that the RS and MS are capable of supporting adjusting sleep mode, then the BS may accordingly perform rescheduling or retransmission. In a varied embodiment, if the BS 1 fails to know in advance whether the RS and MS are capable of supporting adjusting sleep mode, then the method further comprises following steps after step S12: the RS 2b informs the BS 1: the MS 3 is in the triggered listening status within predetermined time interval so that the BS 1 obtains information from the RS and MS in real time to schedule or retransmit data packets.

Figure 7:
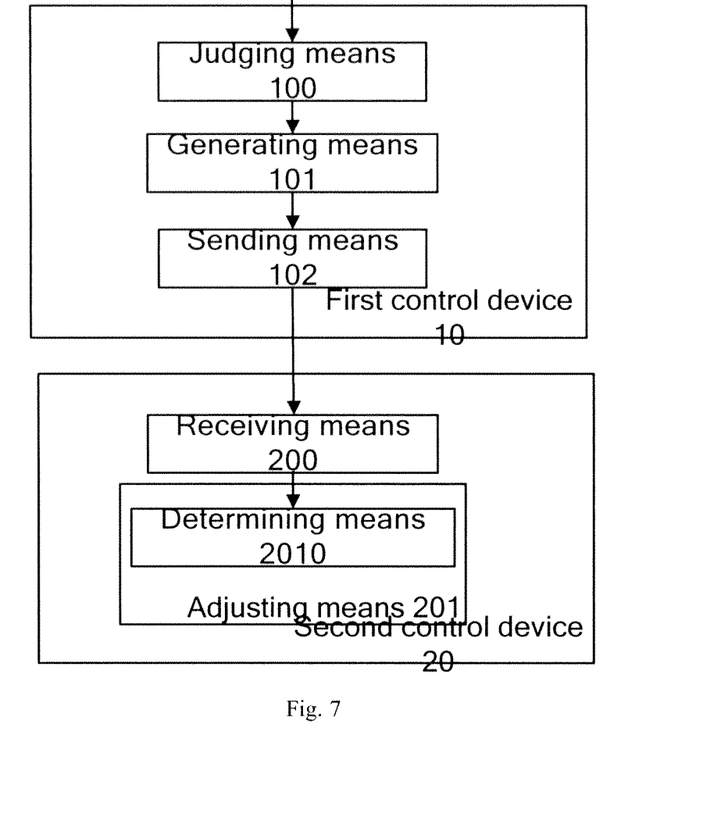
FIG. 7 shows a block diagram of a device according to a detailed embodiment of the present invention.

An embodiment of a device of the present invention is described in detail referring FIG. 7 in combination with FIG. 2, as follows. FIG. 7 shows a block diagram of a device according to a detailed embodiment of the present invention. In an embodiment, a first control device 10 is located in the RS 2b shown in FIG. 2, a second control device 20 is located in the MS 3 shown in FIG. 2.

Wherein, the first control device 10 comprises a judging means 100, a generating means 101 and a sending means 102.

The second control device 20 comprises a receiving means 200 and an adjusting means 201, wherein, the adjusting means 201 further comprises a determining means 2010.

Firstly, the judging means 100 firstly judges whether the previous hop network apparatus of the RS 2b needs to retransmit data packets to the MS 3. As shown in FIG. 2, in the embodiment the previous hop network apparatus of the RS 2b is the RS 2a. When any one of the following three cases occurs, the judging result of the RS 2b is that the previous hop network apparatus needs to retransmit data packets and/or scheduling information to the MS 3:

Case 1: the RS 2b receives data packet from the RS 2a and checks that error occurs from this data packet.

For example, the RS 2b uses cyclic redundancy check code to check data packets from the RS 2a, and judges data packet errs, then the judging means 100 judges the previous hop network apparatus, that is, the RS 2a needs to retransmit data packets and/or scheduling information to the MS 3. Certainly the transmitter and the receiver can also use other error check codes as long as both sides have agreed in advance, all of which belong to the protection scope of the present invention.

Case 2: the RS 2b receives NACK message from the next hop network apparatus.

In the embodiment, the next hop network apparatus of the RS 2b is the MS 3. After the MS 3 receives data packets from the BS 1, the MS 3 will also use cyclic redundancy check code or other error check codes to check the received data packets. If the check failed, the MS 3 will report negative confirmation message. that is, NACK message to the BS 1 to request the BS 1 to retransmit data packets. The NACK message will reach the BS 1 via each RS in the link, that is, the RSs 2b and 2a. When the RS 2b receives NACK message from the MS 3, the judging means 100 judges that the RS 2a needs to transmit scheduling information to the MS 3. For example in the scenario of centralized scheduling, the judging means 100 judges that the RS 2a needs to transmit scheduling information to the MS 3, since the retransmission resource is pre-allocated by the BS 1 and processed and forwarded by each RS in the centralized scheduling scenario.

In a varied embodiment, when the next hop network apparatus of the RS 2b is RS, similarly, the judging means 100 judges the RS 2a needs to transmit scheduling information to the next hop relay apparatus after the RS 2b receives NACK message from the next hop relay apparatus.

Case 3: the RS 2b does not receive feedback message from the MS before a predetermined interval expires.

After the RS 2b transmits data packets to the MS 3, the RS 2b might obtain its position information in advance, which comprises the distance between the RS 2b and the MS 3, such as: hop number information between the RS 2b and the MS 3, then the RS 2b may estimate when the feedback message of the MS 3 can reach the RS 2b. The feedback message comprises positive confirmation message such as ACK and negative confirmation message such as NACK. For example, the RS 2b is 5 hops away from the MS 3, then 5 hops is needed for data packets to reach the MS 3, and the feedback message from the MS 3 to the RS 2b also needs 5 hops to reach the RS 2b, thus the RS 2b can estimate the reaching time of the feedback message. 1) When transmission of data packets in relay link or access link goes wrong so that the MS 3 fails to receive data packets, the MS 3 will not transmit the feedback message to the previous hop network apparatus; thereby the RS 2b is unable to receive the feedback message from the MS 3 within a certain time interval. 2) besides, if the MS 3 receives data packets from the previous hop network apparatus, and transmits feedback message, the feedback message is missed during transmission, the RS 2b is unable to receive the feedback message from the MS 3 within a certain time interval, either. For example, after each data packet reaches the RS 2b, a timer can be set up for the data packet to record the reach time of the feedback message of this data packet. After the timer shows the certain time interval is expired, and the RS 2b does not yet receive the feedback message from the MS 3, the judging means 100 judges that the RS 2a needs to retransmit data packets and/or scheduling information to the MS 3.

When the judging means 100 judges that the RS 2a needs to retransmit data packets and/or scheduling information to the MS 3, the generating means 101 generates adjustment related information of sleep mode.

According to the interaction of network configuration information between the RS 2b and the BS 1, the shared content and frequency, the generating means 101 can generate different adjustment information of sleep mode, which is divided into three solutions to describe:

Solution 1:

The RS 2b obtains network configuration related information from the BS 1 by the coordination with the BS 1, which comprises the scheduling strategy of the BS 1, the retransmission mechanism used by the link in which the RS 2 is located, and the topology of the relay network, etc.

Wherein, the scheduling strategy of the BS 1 comprises load parameters of cells dominated by the BS 1, the priority of each mobile station scheduled by the BS 1, the priority of each different services, etc. For example, the BS1 divides its dominated mobile stations into different priority levels, if data retransmission for the mobile station is needed, the BS 1 can determine the waiting time for scheduling retransmission for the MS according to different priority level of each MS, or, the BS1 divides different services into different levels, the BS1 can also determine the waiting time for scheduling retransmission for different services of MS according to the priority of service. For example, when a MS is VIP user and its requested service is voice service, that is, requiring shorter latency, then the BS1 can schedule retransmission for this VIP user preferentially.

The retransmission mechanism used by the link in which the RS 2 is located comprises retransmission mechanisms of end to end and hop by hop, which are respectively shown in FIGS. 4a and 4b. Wherein, x denotes that data packet transmission fails. The solid line and solid triangle arrow in the figure denote initially transmitted data, the dotted line and a solid triangular arrow denote feedback information, the solid line and diamond arrow denote retransmitted data, the solid line and two hollow triangle arrows denote the data which is not transmitted actually. FIG. 4a shows the retransmission mechanism of end to end, and FIG. 4b shows the retransmission mechanism of hop by hop. As shown in FIG. 4a, in the retransmission mechanism of end to end, each relay apparatus will process data packets, if checking right, forwarding downward: if errors occurs. not forwarding downward, all the positive/negative confirmation information of HARQ will be delivered to the BS 1 together. In FIG. 4a, since no errors occur in the packets transmitted from the BS 1 to the RS 2a, the BS 1 only needs to transmit the RS 2a the scheduling information for indicating the resource for retransmission allocated by the BS 1 and need not retransmit data packets to the RS 2a, the RS 2a retransmits data packets to the RS 2b and forwards the scheduling information. By contrast, as shown in FIG. 4b, in the retransmission mechanism of hop by hop, the RS can react immediately after detecting data packet error. For example, in FIG. 4b, when detecting packet error, the RS 2b can report to the RS 2a immediately, and the retransmission can he established at the nearest RS (for example the RS 2a), thereby the reaction time and transmission delay are shortened, but each RS needs more resource to perform HARQ feedback, at the cost of decreasing certain transmission efficiency.

The topology of the relay network comprises the position information of the RS 2b, etc, for example, comprises the hop number from the RS 2b to the BS 1 and the hop number from the RS 2b to the MS 3.

For example, the RS 2b obtains, from the BS 1, that the retransmission mechanism of the relay network is HARQ retransmission mechanism of hop by hop, therefore, when the RS 2b detects data packets transmission error, the previous hop network apparatus of the RS 2b, namely the RS 2a retransmits data packets. Position information of the RS 2b comprises: the hop number from the RS 2b to the BS 1 is 2 hops, the hop number from the RS 2b to the MS 3 is 5 hops, for example. Furthermore, the MS 3 is VIP user, what the MS 3 requests is voice service, then the RS 2b can estimate the accurate reaching time at which the data packet retransmitted by the RS 2a reaches the MS 3, thus the starting time of the triggered listening status can be determined. Since the starting time of the triggered listening status obtained at this time is an accurate reaching time of data packet, the generating means 101 can calculate the transmission time of data packet according to the size of data packet, and then calculate the end time of the triggered listening status according to the starting time and the transmission time of data packet. As shown in solution 1 in FIG. 5, the RS 2b indicates that the MS 3 switches from sleeping status to the triggered listening status at the time T1, that is, enters triggered listening window at the time T1, and then indicates that the MS 3 switches from the triggered listening status to sleeping status at the time T2, that is, the RS 2b indicates that the MS 3 is in the triggered listening status within the predetermined time interval, namely the time interval from T1 to T2. Alternatively, the RS 2b can also generate indicating information of the starting time T1 of the triggered listening status and predetermined time interval T1-T2.

Solution 2:

The RS 2b obtains network configuration related information from the BS 1 by the coordination with the BS 1, which comprises HARQ retransmission mechanism used by the link in which the RS 2b is located, the topology of the relay network, and position information of the RS 2b, etc.

HARQ retransmission mechanism used by the link in which the RS 2 is located comprises retransmission mechanisms of end to end and hop by hop, which are respectively shown in FIGS. 4a and 4b. Similar to solution 1, it is not necessary to repeat again.

The topology of the relay network comprises the position information of the RS 2b, etc, for example, comprises the hop number from the RS 2b to the BS 1 and the hop number from the RS 2b to the MS 3.

For example, the RS 2b obtains, from the BS 1, that the retransmission mechanism of the relay network is HARQ retransmission mechanism of end to end, therefore, when the RS 2b detects data packets transmission error, the BS 1 schedules retransmission of data packets. Position information of the RS 2b comprises: the hop number from the RS 2b to the BS 1 is 2 hops, the hop number from the RS 2b to the MS 3 is 5 hops, for example. Then, the RS 2b can estimate, according to aforesaid information, the earliest reaching time of the retransmitted data packets. Since this time is the earliest reaching time of the retransmitted data packets, the RS 2b is unable to obtain the accurate time at which the retransmitted data packets reaches the MS 3, but the RS 2b can judge the earliest time at which the retransmitted data packets reaches the MS 3. Therefore, as shown in solution 2 in FIG. 5, the generating means 101 generates the indicating information for indicating that the MS 3 switches from sleeping status to the triggered listening status from the time T3, and is constantly in the triggered listening status.

Solution 3:

If the RS 2b can not obtain the network configuration information from the BS 1, the generating means 101 generates information indicating that the MS 3 needs to be in the triggered listening status within the whole sleeping window, as shown in solution 3 in FIG. 5, so the retransmitted data packets will not be missed.

In the solution 1 and 2, the network configuration information obtained by the RS 2b can be the network configuration information stored in the RS 2b during network configuration initiation after the BS1 and the RS 2b interact network configuration information; the network configuration information obtained by the RS 2*b* can also be the network configuration information which the BS 1 transmits to the RS 2*b* after the RS 2*b* queries the BS 1 in real time.

FIG. 6 shows possible MAC management message format.

The management message is an extension to the payload of MAC message, each field in the MAC management message is respectively described in detail as follows:

Management message type:

Management message type indicates that the message is the message used for adjusting sleep mode, namely for triggering the MS 3 to enter the trigged listening status. The so-called trigged listening status is a temporary listening mode. The MS 3 should have been in sleeping status within this time interval according to initial setting. However, in the present invention, in order to guarantee that the MS 3 can receive the retransmitted data packets from the BS 1, the MS 3 needs to enter temporary listening status within the time interval, thus the listening mode is triggered by the event of retransmitting data packets.

Adjustment options:

Adjustment options, information indicating solution for adjusting temporary triggered window, which can be de denoted by two bits, for example:

00 denotes solution 1;
01 denotes solution 2;
10 denotes solution 3;
11: reserved.

The starting time of listening window (optional)

The starting time of listening window (optional), namely the triggered time of triggering to enter the triggered listening status, the starting time information of the listening window can be denoted by superframe number, frame number and/or subframe number. The starting time can be applied to the solutions 1 and 2 shown in FIG. 5.

The number of listening window (optional)

The number of listening windows (optional), namely the duration of the triggered listening status, the number information of the listening windows can be denoted by the number of superframes, the number of frames and/or the number of subframes. The number of listening window can be applied in the solution 1 shown in FIG. 5.

Furthermore, the number of listening windows can also be replaced by the end time of listening window.

The generating means 101 generates different sleep mode adjustment information by selecting one from solutions 1 to 3 on the basis of aforesaid message format according to the obtained condition of network configuration information. Certainly, the message format is not limited to this, and the above is only an exemplary message format.

Then, the sending means 102 transmits the adjustment related information of sleep mode generated by the generating means 101 to the MS 3, The receiving means 200 in the second control device 20 adjusts the sleep mode of the MS 3 according to the solution in FIG. 5, according to the adjustment related information of sleep mode received from the RS 2*b*. The MS 3 may also accordingly use three kinds of different adjustment modes, corresponding to the three solutions in FIG. 5, which is described as follows:

Adjustment Manner 1:

If the adjustment related information of sleep mode received by the MS 3 indicates the MS 3 to use solution 1, for example, referring to FIG. 6, if the adjustment option in the payload of MAC management message is 00, the adjusting means 201 adjusts the sleep mode according to solution 1 in FIG. 5, for example, entering the triggered listening status at the time T1, and then finishing the triggered listening status at the time T2, and entering sleeping status again.

Adjustment Manner 2:

If the adjustment related information of sleep mode received by the MS 3 indicates the MS 3 to use solution 2, for example, referring to FIG. 6, if the adjustment option in the payload of MAC management message is 01, the adjusting means 201 adjusts the sleep mode according to solution 2, entering the triggered listening status at the time T3.

Adjustment Manner 3:

If the adjustment related information of sleep mode received by the MS 3 indicates the MS 3 to use solution 3, for example, referring to FIG. 6, if the adjustment option in the payload of MAC management message is 10, the adjusting means 201 adjusts the sleep mode according to solution 3, that is, not entering the sleeping status, but keeping listening status.

Furthermore, when the MS 3 detects that data transmission is finished, it can enter the sleeping status automatically. Optionally, the MS 3 can also enter the sleeping status according to the indicating of the RS 2*b*, as shown in solution 1.

In aforesaid embodiment, the generating means 101 in the first control device 10 in the RS 2*b* generates the adjustment related information of sleep mode according to network configuration information, which considers that the RS and BS both belong to network apparatus and are managed by operator, and interacting network topology between the RS and BS will not disclose network information to users, which guarantees the network safety.

Without considering the network safety, in a varied embodiment, the first control device 10 may not comprise generating means, then the adjustment related information transmitted by the sending means 102 to the receiving means 200 in the MS 3 comprises network configuration information. For example, network configuration information may comprise the position information of the RS in which error is found. For example, when the judging means 100 detects error packet, the RS 2*b* can add identification information into the packet to identify that data packet error occurs in the second hop. Furthermore, the adjustment related information may also comprise the retransmission mechanism configured by the BS dominating the MS, the scheduling strategy of the BS, etc.

The adjusting means 201 further comprises the determining means 2010. The determining means 2010 determines mode adjustment information for adjusting sleep mode according to the network configuration information. For example, the MS 3 determines which one of solutions 1 to 3 should be used to adjust the sleep mode of the MS 3, according to the obtained position information of the RS in which error is found and the retransmission mechanism configured by the BS 1. Since the operation performed by the determining means 2010 is basically similar to the operation performed by the generating means 101, it is not necessary to repeat again.

The application scenario of the embodiment is that the BS 1 has already known in advance during the initial period of network configuration that the RS and MS are capable of supporting adjusting sleep mode, then the BS may accordingly perform rescheduling or retransmission. In a varied embodiment, if the BS 1 fails to know in advance whether the RS and MS are capable of supporting adjusting sleep mode, then the first control device further comprises an informing means (not shown in FIG. 7): the informing means informs the BS 1: the MS 3 is in the triggered listening status within predetermined time interval so that the BS 1 obtains information from the RS and MS in real time to schedule or retransmit data packets.

Embodiment of the present invention is described as above, but the present invention is not restricted to specific system, apparatus and detailed protocol, the skilled in the art can make a variety of variants or modification within the scope of the appended claims.

The invention claimed is:

1. A method, in the wireless relay apparatus, for controlling a mobile station dominated by a relay apparatus to adjust a sleep mode, wherein the method comprises:
   judging, by the relay apparatus, whether previous hop network equipment of the relay apparatus needs to resend data packets and/or scheduling information to the mobile station;
   generating, by the relay apparatus, adjustment related information for adjusting the sleep mode of the mobile station when the previous hop network equipment of the relay apparatus needs to resend data packets and/or scheduling information to the mobile station according to network configuration information obtained from a base station dominating the relay apparatus, wherein the network configuration information comprises position information of the relay apparatus in a multi-hop relay network, and the generating of the adjustment related information further comprises determining a starting time of the triggered listening status according to the position information; and
   sending the adjustment related information for adjusting the sleep mode of the mobile station, by the relay apparatus, to the mobile station when the previous hop network equipment needs to resend data packets and/or scheduling information to the mobile station.

2. The method according to claim 1, wherein the adjustment related information comprises information for indicating that the mobile station is in triggered listening status within a predetermined time interval.

3. The method according to claim 1, wherein the adjustment related information comprises information for indicating that the mobile station is in triggered listening status within a predetermined time interval within a sleeping window.

4. The method according to claim 1, wherein the network configuration information further comprises information regarding a retransmission mechanism and a scheduling strategy of the base station and generating the adjustment related information according to network configuration information further comprises:
   determining any one of following items according to the position information, the retransmission mechanism and the scheduling strategy of the base station:
   the starting time and end time of the triggered listening status; and
   the starting time of the triggered listening status and duration of the triggered listening status.

5. The method according to claim 4, wherein the retransmission mechanism comprises any one of following:
   the multi-hop relay network is retransmission hop by hop;
   the multi-hop relay network is retransmission end to end; and
   the scheduling strategy is based on any one or more of:
   load parameters of cell dominated by the base station; and
   priority for the base station to schedule each mobile station.

6. The method according to claim 1, wherein after the generating the adjustment related information according to the network configuration information, the method further comprises:
   informing the previous hop network equipment that the mobile station is in the triggered listening status within the predetermined time interval.

7. A method, in wireless mobile station, for adjusting sleep mode, wherein the method comprises:
   receiving adjustment related information, generated by a relay apparatus, for adjusting sleep mode of the mobile station, from the relay apparatus; and
   adjusting sleep mode according to the adjustment related information wherein adjusting the sleep mode according to the adjustment related information further comprises: determining mode adjustment information for adjusting the sleep mode according to the adjustment related information; and adjusting the sleep mode according to the mode adjustment information wherein the adjustment related information comprises: position information of the relay apparatus which receives wrong data packets in multi-hop relay network in which the mobile station is located; retransmission mechanism configured by base station dominating the mobile station; and scheduling strategy of the base station.

8. The method according to claim 7, wherein the adjustment related information comprises information for indicating that the mobile station is within a predetermined time interval of a triggered listening status, and adjusting the sleep mode according to the adjustment related information further comprises:
   being in the triggered listening status according to the predetermined time interval.

9. The method according to claim 7, comprising:
   entering sleeping status if the mobile station is still in a sleeping window the moment the mobile station has finished receiving data in the triggered listening status.

10. A first control device, for a wireless relay apparatus, for controlling a mobile station dominated by the relay apparatus to adjust sleep mode, wherein the first control device comprises:
    at least one processor configured as:
    an evaluator, for judging whether previous hop network equipment of the relay apparatus needs to resend data packets and/or scheduling information to the mobile station;
    an information generator for generating adjustment related information for adjusting the sleep mode of the mobile station when the evaluator judges that the previous hop network equipment of the relay apparatus needs to resend data packets and/or scheduling information to the mobile station wherein the adjustment related information is generated according to network configuration information obtained from a base station dominating the relay apparatus, wherein the network configuration information comprises position information of the relay apparatus in a multi-hop relay network, and the generating of the adjustment related information further comprises determining a starting time of the triggered listening status according to the position information; and
    an adjustment controller, for sending adjustment related information for adjusting a sleep mode of the mobile station to the mobile station when the previous hop network equipment needs to resend data packets and/or scheduling information to the mobile station.

11. A wireless mobile station, comprising:
at least one processor configured as:
a receiver, for receiving adjustment related information, generated by a relay apparatus according to network configuration information obtained from a base station dominating the relay apparatus, wherein the network configuration information comprises position information of the relay apparatus in a multi-hop relay network, and the generating of the adjustment related information further comprises determining a starting time of the triggered listening status according to the position information, the adjustment related information being for adjusting a sleep mode of the mobile station, from the relay apparatus; and
an adjuster, for adjusting the sleep mode according to the adjustment related information.

* * * * *